(12) United States Patent
Lall et al.

(10) Patent No.: US 7,661,878 B1
(45) Date of Patent: Feb. 16, 2010

(54) ON-CHIP TEMPERATURE SENSOR FOR AN INTEGRATED CIRCUIT

(75) Inventors: Ravindar M. Lall, Portland, OR (US);
Nathan Green, Beaverton, OR (US);
Mose S. Wahlstrom, Aloha, OR (US);
Wei Han, Hillsboro, OR (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 8 days.

(21) Appl. No.: 12/099,933

(22) Filed: Apr. 9, 2008

Related U.S. Application Data

(63) Continuation-in-part of application No. 11/750,616, filed on May 18, 2007, now Pat. No. 7,632,011.

(51) Int. Cl.
*G01K 7/00* (2006.01)

(52) U.S. Cl. ...................... 374/170; 374/172

(58) Field of Classification Search .............. 374/1, 374/170, 172, 178; 702/130; 327/512
See application file for complete search history.

(56) References Cited

U.S. PATENT DOCUMENTS

| 5,085,526 | A | * | 2/1992 | Sawtell et al. ............... 374/101 |
|---|---|---|---|---|
| 5,519,354 | A | | 5/1996 | Audy |
| 5,619,430 | A | * | 4/1997 | Nolan et al. .................. 702/63 |
| 6,412,977 | B1 | * | 7/2002 | Black et al. .................. 374/178 |
| 6,749,335 | B2 | * | 6/2004 | Gauthier et al. ............. 374/172 |
| 7,034,507 | B2 | | 4/2006 | Lovett |
| 7,135,913 | B2 | * | 11/2006 | Min et al. .................... 327/541 |
| 7,197,420 | B2 | * | 3/2007 | Johns et al. ................. 702/130 |
| 7,225,099 | B1 | * | 5/2007 | O'Dwyer ..................... 702/130 |
| 7,410,293 | B1 | * | 8/2008 | Santurkar et al. ........... 374/178 |
| 7,524,107 | B1 | * | 4/2009 | Lorenz ....................... 374/170 |
| 2003/0214998 | A1 | * | 11/2003 | Gauthier et al. ............. 374/141 |
| 2005/0093617 | A1 | * | 5/2005 | Min et al. .................... 327/538 |
| 2006/0111865 | A1 | * | 5/2006 | Choi .......................... 702/130 |
| 2007/0258503 | A1 | * | 11/2007 | Clark et al. .................... 374/1 |
| 2008/0151966 | A1 | * | 6/2008 | Clark et al. ................. 374/178 |
| 2009/0110023 | A1 | * | 4/2009 | Clark et al. .................... 374/1 |

* cited by examiner

*Primary Examiner*—Andre J Allen

(57) ABSTRACT

An on-chip temperature sensor for an integrated circuit includes in one embodiment a voltage/current source circuit that provides a reference voltage and a current. A sense signal circuit receives the current of the voltage/current source circuit and provides a sense signal corresponding to the temperature of the integrated circuit. A reference signal receives the reference voltage of the voltage/current source circuit and provides a reference signal having a selectable value. A comparator compares the sense signal of the sense signal circuit to the selectable reference signal of the reference signal circuit and provides a temperature sensor output signal.

21 Claims, 3 Drawing Sheets

ON-CHIP TEMPERATURE SENSOR FOR AN INTEGRATED CIRCUIT

TECHNICAL FIELD

The present invention relates generally to electrical circuits and, more particularly, to temperature sensors for integrated circuits such as programmable logic devices.

BACKGROUND

Power dissipation, especially for large integrated circuits, tends to generate a significant amount of heat, which may raise the junction temperature of the integrated circuit above safe reliability limits (e.g., above process limits). Consequently, it is important to monitor and maintain the temperature of the integrated circuit to within safe operating limits to prevent failure or a noticeable reduction in device lifetime.

A common approach to monitoring integrated circuit junction temperature uses an on-chip temperature sensing diode connected between two input/output pins of the integrated circuit. A separate integrated circuit then monitors the voltage difference between the two pins. Thus this approach requires a separate integrated circuit on the printed circuit board to receive and translate the diode voltage and/or current (e.g., using a delta-sigma analog-to-digital converter) into a corresponding temperature value, which may be complex and costly in terms of printed circuit board space, interface limitations, assembly costs, and/or power requirements.

As a result, there is a need for improved techniques for measuring the temperature of an integrated circuit.

SUMMARY

An on-chip temperature sensor for an integrated circuit comprises a voltage/current source circuit adapted to provide a reference voltage and a current; a sense signal circuit adapted to receive the current of the voltage/current source circuit and to provide a sense signal corresponding to the temperature of the integrated circuit; a reference signal circuit adapted to receive the reference voltage of the voltage/current source circuit and to provide a reference signal having a selectable value; and a comparator adapted to compare to the sense signal of the sense signal circuit to the selectable reference signal of the reference signal circuit and to provide a temperature sensor output signal.

In accordance with one embodiment of the invention, the voltage/current source circuit comprises a bandgap reference circuit adapted to provide a constant reference voltage to the reference signal circuit; and a constant current generator adapted to provide a constant current to the sense signal circuit. The sense signal circuit comprises a bipolar diode adapted to receive the constant current of the constant current generator and to provide the sense signal for the comparator.

In accordance with another embodiment of the invention, the voltage/current source circuit comprises a bandgap reference circuit adapted to provide a constant reference voltage to the reference signal circuit and a current proportional to temperature to the sense signal circuit. The sense signal circuit comprises a sense resistor geometrically matched to a resistor within the bandgap reference circuit, the sense resistor adapted to receive the proportional current and to produce a proportional voltage as the sense signal.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

In accordance with one or more embodiments of the present invention, temperature sensor systems and methods are disclosed for integrated circuits, which specifically may be implemented within the integrated circuit itself to monitor integrated circuit temperature (e.g., on die temperature sensor techniques). For example, the temperature sensor systems and methods may provide a temperature measurement or a temperature warning indication from within the integrated circuit based on the internal temperature monitoring of the integrated circuit.

It should be understood that embodiments of the present invention may be implemented within any type of integrated circuit as would be understood by one skilled in the art. As an implementation example for an embodiment, a programmable logic device (PLD) is illustrated as an example of an integrated circuit that may include a temperature sensor system as discussed herein, but this is not limiting as any type of integrated circuit may use the techniques disclosed herein for monitoring integrated circuit temperature.

Figure 1:
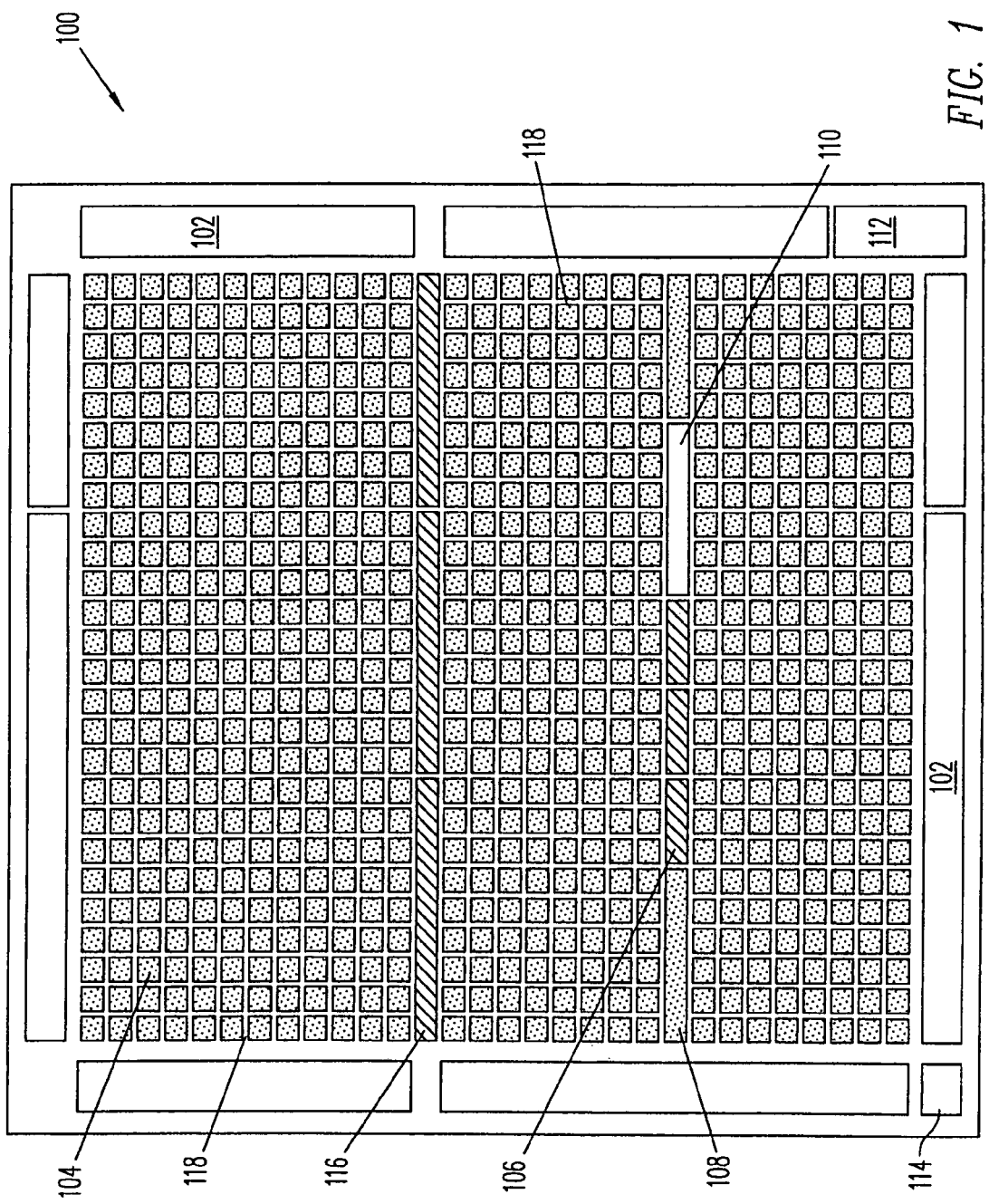
FIG. 1 shows a block diagram illustrating a programmable logic device in accordance with an embodiment of the present invention.

As an example, FIG. 1 shows a block diagram illustrating a programmable logic device (PLD) 100 in accordance with an embodiment of the present invention. PLD 100 (e.g., an FPGA, a CPLD, or a field programmable system on a chip (FPSC)) may include input/output (I/O) blocks 102 and logic blocks 104 (e.g., also referred to as programmable logic blocks (PLBs), programmable functional units (PFUs), or programmable logic cells (PLCs)). I/O blocks 102 provide I/O functionality (e.g., supports one or more I/O and/or memory interface standards) for PLD 100, while programmable logic blocks 104 provide logic functionality (e.g., LUT-based logic) for PLD 100.

PLD 100 may also include blocks of memory 106 (e.g., blocks of EEPROM, block SRAM, and/or flash memory), clock-related circuitry 108 (e.g., PLL and/or DLL circuits), configuration logic 110 (e.g., for startup, encryption, and/or error detection), a configuration port 112, configuration memory 114, special function blocks 116 (e.g., DSP blocks or other forms of multiply and accumulate circuit functionality), and/or routing resources 118 (e.g., a conventional general interconnect routing fabric throughout PLD 100).

Configuration port 112 may be optionally implemented and used for programming memory 106 and/or configuration memory 114 of PLD 100 as would be understood by one skilled in the art. For example, configuration port 112 may include a programming port, such as a central processing unit (CPU) port (also referred to as a peripheral data port or a sysCONFIG programming port) and/or a programming port such as a joint test action group (JTAG) port (e.g., by employing standards such as Institute of Electrical and Electronics Engineers (IEEE) 1149.1 or 1532 standards). Configuration port 112 typically may be included to receive configuration data and commands.

It should be understood that the number and placement of the various elements, such as I/O blocks 102, logic blocks 104, memory 106, clock-related circuitry 108, configuration logic 110, configuration port 112, configuration memory 114, special function blocks 116, and routing resources 118, is not limiting and may depend upon the desired application. For example, special function blocks 116 are optional as are various other elements (e.g., memory 106) and may not be required for a desired application. Furthermore, it should be understood that the elements are illustrated in block form for clarity and that certain elements, such as configuration memory 114 for example, would typically be distributed throughout PLD 100, such as in and between logic blocks 104, to perform their conventional functions (e.g., storing configuration data that configures PLD 100).

Figure 2:
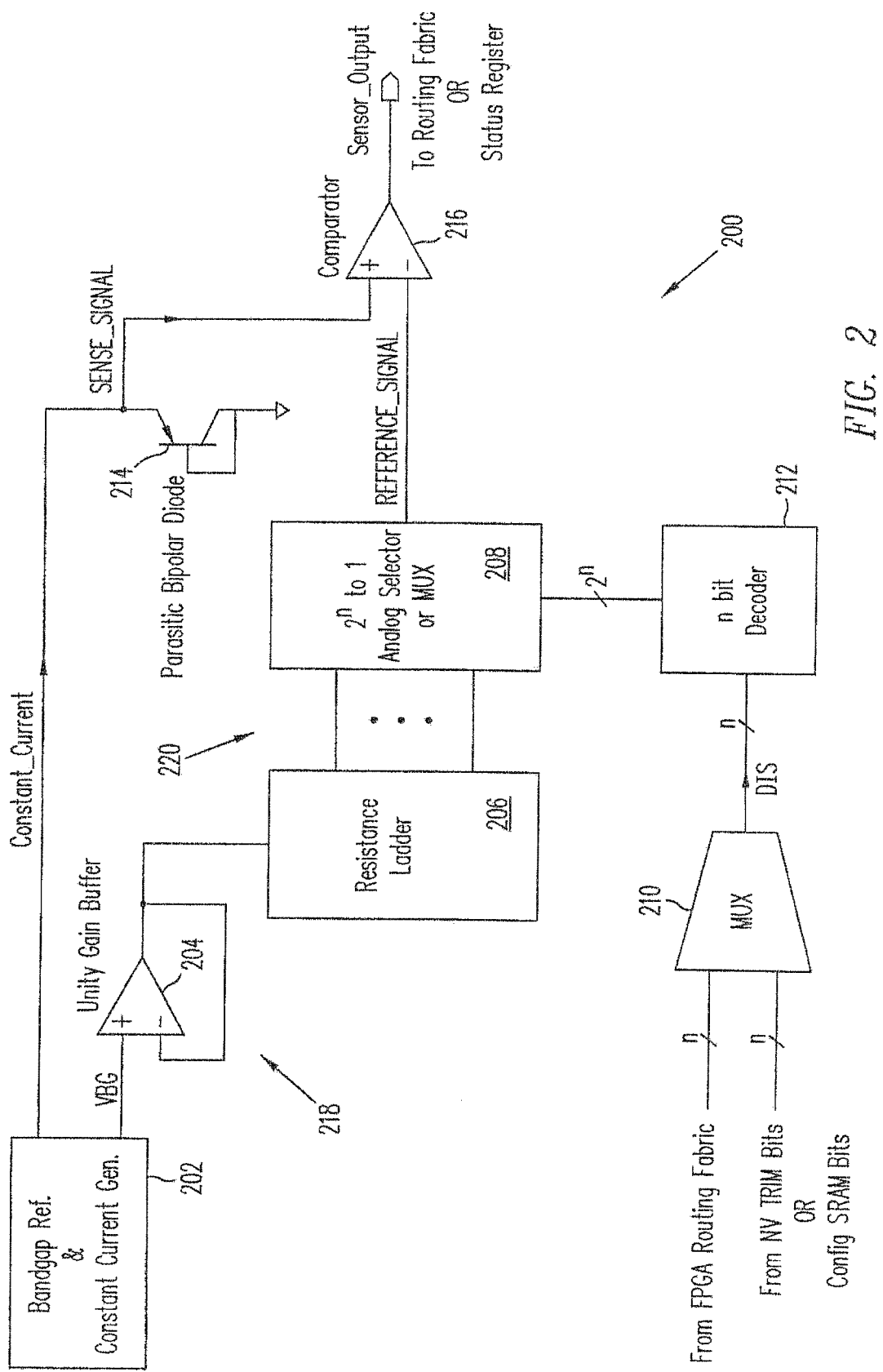
FIG. 2 shows a circuit block diagram illustrating an example of a temperature sensor for the programmable logic device of FIG. 1 in accordance with a first embodiment of the present invention.

FIG. 2 shows a circuit block diagram illustrating an example of a temperature sensor for the programmable logic device of FIG. 1 in accordance with a first embodiment of the present invention. Circuit 200 is an example of a temperature sensor that may be implemented within an integrated circuit such as PLD 100 to monitor a junction temperature (device temperature) of the PLD. Circuit 200 (e.g., representing an on-die temperature sensor) includes a voltage/current source circuit 218, a selectable reference signal circuit 220, a sense signal circuit such as bipolar diode 214 (e.g., a bipolar junction transistor configured as a parasitic bipolar diode), and a comparator 216.

In general, selectable reference signal circuit 220 and bipolar diode 214 receive a reference voltage (labeled VBG) and a reference current (labeled Constant_Current), respectively, from voltage/current source circuit 218. Bipolar diode 214 provides a sense signal to the positive input of comparator 216, which compares the sense signal to a reference signal from selectable reference signal circuit 220 applied to the negative input of the comparator. As a result of the comparison, comparator 216 provides a temperature sensor output signal (e.g., a digital output labeled F).

The sense signal is temperature dependent due to bipolar diode 214 having an emitter-base voltage (Veb) that changes with temperature (e.g., approximately 2 mV/° C.). Thus, because the emitter-base voltage (Veb) changes with temperature, every value of the emitter-base voltage (Veb) may have a particular corresponding temperature value (junction temperature value) of the integrated circuit. For example, as the junction temperature of PLD 100 increases, a voltage level of the sense signal will decrease in a corresponding fashion due to the corresponding decrease in the emitter-base voltage (Veb) of bipolar diode 214. Consequently, by proper selection of a value for the reference signal, comparator 216 may be used to monitor the sense signal and indicate via the temperature sensor output signal when a desired temperature has been exceeded by comparing the sense signal to the reference signal.

The temperature sensor output signal (Sensor_Output) may be provided to the PLD's routing fabric (e.g., routing resources 118 of FIG. 1), which may be used to control certain functions based on the signal value (e.g., logical low value indicating a high temperature indication). For example, clock signals may be modified (e.g., gate clocks or reduce clock frequency) or a power down mode may be initiated for the PLD. Alternatively, the temperature sensor output signal (Sensor_Output) may be provided external to the PLD (e.g., via a status register, output pin, and/or JTAG interface) to indicate to an external device whether a high temperature condition exists. For example, the external device may remove power from the PLD (e.g., switch off the PLD) or take other measures to address the high temperature condition.

Voltage/current source circuit 218 may be implemented, for example, with a circuit 202 and an optional buffer 204 (e.g., a unity gain buffer). Circuit 202 may include or represent, for example, a conventional bandgap reference circuit to provide the reference voltage (VBG, a process, voltage, and temperature compensated bandgap voltage) and a constant current generator (which may be part of the bandgap reference circuit) to provide the reference current (Constant_Current). For example, the reference current (Constant_Current) may represent a process, current, and temperature compensated constant, trimmed current of approximately 10 uA.

Selectable reference signal circuit 220 may be implemented, for example, with a resistance ladder 206, a multiplexer 208, and a decoder 212 (e.g., an n-bit decoder). Resistance ladder 206 (e.g., a resistor stack) receives the reference voltage (VBG) generated by circuit 202 and through multiple tap points provides a plurality of voltage levels based on the reference voltage (VBG), which are selectable by multiplexer 208 to provide a desired value of the reference signal for comparator 216. Alternatively, selectable reference signal circuit 220 may be implemented, for example, with resistance ladder 206 that provides the plurality of voltage levels to a corresponding plurality of comparators 216, with each comparing the sense signal to the corresponding voltage level from resistance ladder 206. For this implementation as an example, the temperature sensor output signal (Sensor_Output) would consist of a multi-bit output signal, with the number of bits corresponding to the number of comparators 216.

Decoder 212 may be implemented, for example, to control the selection by multiplexer 208 (e.g., by providing a $2^n$ control signal as shown) of one of the voltage levels to provide as the value of the reference signal to comparator 216. Alternatively, a control signal may be provided directly (e.g., without implementing decoder 212) to multiplexer 208 to control the selection by multiplexer 208.

Means such as a multiplexer 210 controls the selection of the value for the selectable reference signal. For example, a decoder input signal (labeled DIS, e.g., an n-bit control signal as shown) for decoder 212 may be provided by multiplexer 210, which may choose from various selectable input signals to provide as the decoder input signal (DIS). As an example, one of the selectable input signals may be provided by the PLD's (e.g., FPGA) routing fabric, which may allow dynamic control to select the desired voltage level that corresponds to a desired temperature setting to provide for the reference signal to comparator 216. By providing dynamic control, this allows ease of characterization for the temperature setting selection and process, with the selectable input signal set for example as fixed code in the logic fabric (e.g., performed by logic blocks 104 of FIG. 1) or provided via an input pin through the routing fabric (e.g., via routing resources 118 of FIG. 1) to multiplexer 210 (or directly to multiplexer 208).

Other possible selectable input signals to multiplexer 210 may, for example, be provided by memory, non-volatile or volatile, within the PLD (e.g., memory 106 or configuration memory 114 of FIG. 1). For example for non-volatile memory, one block of memory 106 may be implemented as flash memory, with some of the memory cells used as non-volatile (NV) trim bits, which may be set by the manufacturer or user of the PLD to provide one or more of the selectable input signals. As example for volatile memory, configuration memory 114 (configuration SRAM bits) may be used or one block of memory 106 may be implemented as block RAM within the PLD to provide one or more of the selectable input signals.

Figure 3:
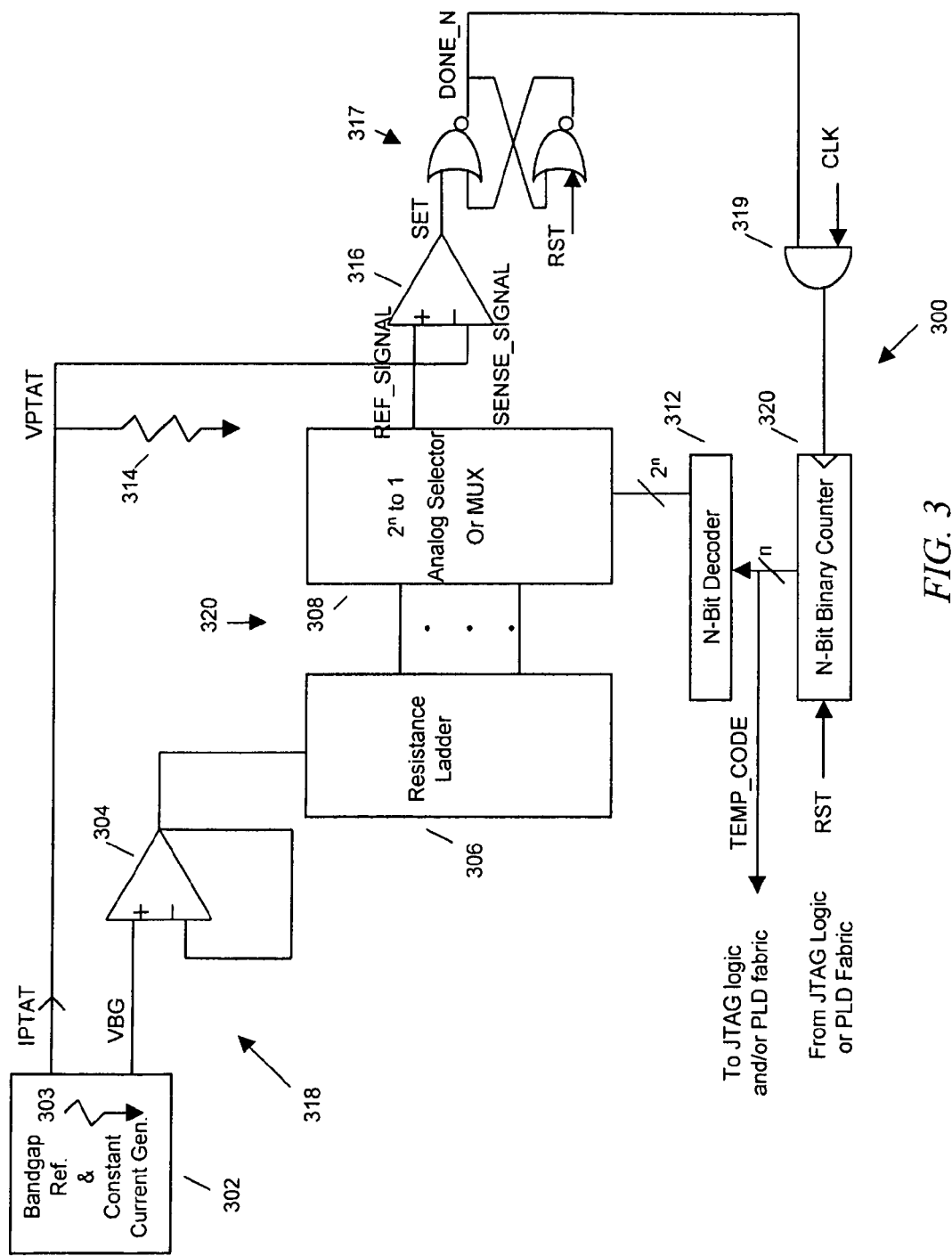
FIG. 3 shows a circuit block diagram illustrating an example of a temperature sensor for the programmable logic device of FIG. 1 in accordance with a second embodiment of the present invention.

FIG. 3 shows a circuit block diagram illustrating an example of a temperature sensor for the programmable logic device of FIG. 1 in accordance with a second embodiment of the present invention. Although the general concept of an integrated circuit temperature sensor in both embodiments is the same, their structures differ in a number of ways. For example, the temperature sensor of the first embodiment generates a single-bit signal indicating whether a programmed temperature value has been reached. In contrast, the temperature sensor of the second embodiment generates a multi-bit temperature code. The similarities and differences between the two embodiments will be come evident from the following description.

Circuit 300 is another example of a temperature sensor that may be implemented within an integrated circuit such as PLD 100 to monitor a junction temperature (device temperature) of the PLD. Circuit 300 (e.g., representing an on-die temperature sensor) includes a voltage/current source circuit 318, a selectable reference signal circuit 320, a sense signal circuit such as a sense resistor 314 embedded in the PLD, and a comparator 316. Voltage/current source circuit 318 comprises a bandgap reference circuit 302, which is adapted to provide a constant reference voltage (labeled VBG) to reference signal circuit 320 and a current proportional to absolute temperature (labeled IPTAT) to sense resistor 314. Circuit 302 is of conventional design and includes a bandgap resistor 303 that produces IPTAT. Sense resistor 314 is geometrically matched to bandgap resistor 303 in that resistor 314 has dimensions that are a multiple of the dimensions of resistor 303. The flow of IPTAT through resistor 314 thus produces a sense voltage signal that is also proportional to absolute temperature (labeled VPTAT above resistor 314) and is process independent. The sense voltage signal (labeled SENSE_SIGNAL) is applied to the negative input of comparator 316.

As in the first embodiment, the constant reference voltage VBG from bandgap reference circuit 302 is applied through a unity gain buffer 304 to reference signal circuit 320. And as in the first embodiment (FIG. 2), the reference signal circuit includes a resistance ladder 306, a multiplexer 308, and a decoder 312 that function in the same manner as their counterparts in the first embodiment. The reference signal circuit 320 produces in turn a reference signal voltage (labeled REF_SIGNAL) that is applied to the positive input of comparator 316. In response to these signals at its inputs, comparator 316 provides a temperature sensor single-bit output signal (labeled SET), which is a logic high if the reference voltage signal exceeds the sense voltage signal and is a logic low if the opposite is true.

Additional structure in circuit 300 includes an RS latch 317 coupled to receive the SET signal from comparator 316, an AND gate 319, and a counter 320. AND gate 319 receives the output signal of RS latch 317 (labeled DONE_N) and a clock signal (labeled CLK) such as generated by an on-chip free-running oscillator. Counter 320 receives at its clock input the output signal of AND gate 319 at receives at its reset input a reset pulse (labeled RST). The reset pulse may be generated by a number of off- or on-chip sources such as the JTAG logic or the PLD fabric. The counter output signal is the decoder input signal for decoder 312, and counter 320 thus is another example of means for controlling the selection of the value for the selectable reference signal. The counter output signal is also provided to the JTAG logic and/or PLD fabric as a multi-bit temperature code signal (labeled TEMP_CODE) that can be used in the same manner as the Sensor_Output signal described above in the first embodiment.

In operation, counter 320 and RS latch 317 are initially reset by the RST signal. The reset pulse is of sufficient duration to initialize the counter's output to zero and the latch's output to a logic high. Consequently, SENSE_SIGNAL exceeds REF_SIGNAL, comparator 316 outputs a logic low for SET, and RS latch 317 inverts SET to produce a logic high for DONE_N. AND gate 319 is now enabled by DONE_N, and CLK pulses pass through the AND gate to be counted by counter 320. The cumulative count output by the counter is the decoder input signal. Decoder 312 decodes this signal and produces at its output the multiplexer control signal for multiplexer 308, with the value of the control signal incrementally increasing as the count increases. Multiplexer 308 responds to the changing control signal by selecting different inputs from resistance ladder 306, effectively "walking up" the resistance ladder. The change in the resistance causes REF_SIGNAL to increase. However, so long as SENSE_SIGNAL exceeds REF_SIGNAL, the comparator does not change the logic state of SET, counter 320 continues to count, and the decoder input signal/TEMP_CODE continues to increase in value. If and when REF_SIGNAL exceeds SENSE_SIGNAL, comparator 320 trips and sets RS latch 317. This causes DONE_N to go low, disabling AND gate 319 and causing counter 320 to stop counting. The decoder input signal/TEMP_CODE is now frozen and can be read via JTAG commands, the FPGA fabric, or other means. In one embodiment, TEMP_CODE and DONE_N form a multi-bit signal that indicates when DONE_N goes low that TEMP_CODE should now be read.

Additional temperature readings can be taken by resetting counter 320 and RS latch 317 with another RST pulse.

Systems and methods are disclosed herein to provide temperature monitoring for integrated circuits. For example, in accordance with an embodiment of the present invention, a temperature sensor circuit (e.g., an on die temperature sensor) is disclosed that may be implemented within any type of integrated circuit (e.g., a PLD). As an example, a number of the temperature sensor circuits may be implemented within the integrated circuit to monitor various regions and indicate if a maximum integrated circuit temperature (e.g., junction temperature) is exceeded. For example, circuit 200 may be replicated within the integrated circuit or circuit 200 may support multiple bipolar diodes 214 within the integrated circuit as would be understood by one skilled in the art.

In contrast to some conventional approaches, the systems and methods disclosed herein may be implemented completely within the integrated circuit itself (e.g., with minimal circuitry). Furthermore, the temperature sensor systems and methods, for example, may be characterized to account for certain variables (e.g., bandgap voltage variation, constant current variations, and/or comparator offsets) and to provide for the proper selection of the reference signal.

The embodiments described above illustrate but do not limit the invention. It should also be understood that numerous modifications and variations are possible in accordance with the principles of the present invention. For example, the source circuit may be implemented as one or more circuits performing the described functions. Accordingly, the scope of the invention is defined only by the following claims.

The invention claimed is:

1. An integrated circuit comprising:
a voltage/current source circuit adapted to provide a reference voltage and a current;
a sense signal circuit adapted to receive the current of the voltage/current source circuit and to provide a sense signal corresponding to the temperature of the integrated circuit;
a reference signal circuit adapted to receive the reference voltage of the voltage/current source circuit and to provide a reference signal having a selectable value, the reference signal circuit including a resistance ladder adapted to receive the reference voltage and to provide a plurality of selectable reference values based on the reference voltage and a multiplexer adapted to receive the selectable reference values and to provide the reference signal with a selected value based on a multiplexer control signal; and
a comparator adapted to compare the sense signal of the sense signal circuit to the reference signal with a selected value and to provide a temperature sensor output signal.

2. The integrated circuit of claim 1, wherein the voltage/current source circuit comprises:
a bandgap reference circuit adapted to provide a constant reference voltage to the reference signal circuit; and
a constant current generator adapted to provide a constant current to the sense signal circuit.

3. The integrate circuit of claim 2, wherein the sense signal circuit comprises a bipolar diode adapted to receive the constant current of the constant current generator and to provide the sense signal for the comparator.

4. The integrated circuit of claim 3, wherein the bipolar diode comprises a bipolar junction transistor having a base terminal coupled to a collector terminal, and wherein a value of the sense signal corresponds to the emitter-base voltage of the bipolar junction transistor.

5. The integrated circuit of claim 2, wherein the voltage/current source circuit further comprises a buffer circuit adapted to receive the constant reference voltage of the bandgap reference circuit and to provide the reference voltage signal to the reference signal circuit, and wherein the constant reference voltage and the constant current are process and temperature compensated.

6. The integrated circuit of claim 1, wherein the reference signal circuit further includes a decoder adapted to receive a decoder input signal and to provide the multiplexer control signal based on the decoder input signal.

7. The integrated circuit of claim 6 including a second multiplexer adapted to receive a plurality of multiplexer input signals and to provide one of the plurality as the decoder input signal.

8. The integrated circuit of claim 7, wherein the multiplexer input signals are provided from within the integrated circuit and/or external to the integrated circuit.

9. The integrated circuit of claim 6 including a counter adapted to provide the decoder input signal, the counter responsive to the temperature sensor output signal of the comparator.

10. The integrated circuit of claim 1, wherein the voltage/current source circuit comprises a bandgap reference circuit adapted to provide a constant reference voltage to the reference signal circuit and a current proportional to temperature to the sense signal circuit.

11. The integrated circuit of claim 10, wherein the bandgap reference circuit includes a bandgap resistor and the sense signal circuit comprises a sense resistor geometrically matched to the bandgap resistor, the sense resistor adapted to receive the proportional current and to produce a proportional voltage as the sense signal.

12. The integrated circuit of claim 1, wherein the integrated circuit comprises a programmable logic device.

13. An integrated circuit comprising:
a bandgap reference circuit adapted to provide a constant reference voltage and a current proportional to the temperature of the integrated circuit, the bandgap reference circuit including a bandgap resistor;
a sense resistor matched to the bandgap resistor, the sense resistor responsive to the proportional current of the bandgap reference circuit and adapted to provide a sense voltage signal proportional to the temperature of the integrated circuit;
a reference signal circuit adapted to receive the constant reference voltage of the bandgap reference circuit and to provide a reference voltage signal having a selectable value; and
a comparator adapted to compare the sense voltage signal of the sense resistor to the reference voltage signal with a selected value and to provide a temperature sensor output signal.

14. The integrated circuit of claim 13, wherein the reference signal circuit comprises:
a resistance ladder adapted to receive the constant reference voltage and to provide a plurality of the selectable reference values based on the constant reference voltage;
a multiplexer adapted to receive the selectable reference values and to provide the reference voltage signal with a selected value based on a multiplexer control signal; and
a decoder adapted to receive a decoder input signal and provide the multiplexer control signal based on the decoder input signal.

15. The integrated circuit of claim 13 including a counter adapted to provide the decoder input signal, the counter responsive to the temperature sensor output signal of the comparator.

16. The integrated circuit of claim 15, wherein the integrated circuit comprises a programmable logic device, and wherein logic of the programmable logic device is coupled to receive the decoder input signal provided by the counter.

17. A programmable logic device comprising:
a voltage/current source circuit adapted to provide a reference voltage and a current;
a sense signal circuit adapted to receive the current of the voltage/current source circuit and to provide a sense signal corresponding to the temperature of the programmable logic device;
a resistance ladder adapted to receive the reference voltage of the voltage/current source circuit and to provide a plurality of selectable values based on the reference voltage;
a multiplexer adapted to receive the selectable reference values and to provide a reference voltage signal with a selected value based on a multiplexer control signal;
a decoder adapted to receive a decoder input signal and provide the multiplexer control signal based on the decoder input signal;
a comparator adapted to compare the sense signal to the reference voltage signal with a selected value and to provide a temperature sensor output signal; and
a counter adapted to provide the decoder input signal, the counter responsive to the temperature sensor output signal of the comparator, wherein logic of the programmable logic device is coupled to receive the decoder input signal provided by the counter.

18. The programmable logic device of claim 17, wherein the voltage/current source circuit comprises a bandgap reference circuit adapted to provide a current proportional to the temperature of the programmable logic device, and the sense signal circuit comprises a sense resistor adapted to receive the proportional current and to produce a proportional voltage as the sense signal, the sense resistor geometrically matched to a bandgap resistor within the bandgap reference circuit.

19. An integrated circuit comprising:
  a sense signal circuit adapted to provide a sense signal corresponding to the temperature of the integrated circuit;
  a reference signal circuit adapted to provide a reference signal having a selectable value, the reference signal circuit including:
    a resistance ladder adapted to receive a reference voltage and to provide a plurality of selectable reference values based on the reference voltage; and
    a multiplexer adapted to receive the selectable reference values and to provide the reference signal with a selected value based on a multiplexer control signal; and
  a comparator adapted to compare the sense signal of the sense signal circuit to the reference signal with a selected value and to provide a temperature sensor output signal.

20. The integrated circuit of claim 19, wherein the sense signal circuit comprises a bipolar diode.

21. The integrated circuit of claim 19, wherein the sense signal circuit comprises a sense resistor.

* * * * *